United States Patent
Gschwendtner et al.

(10) Patent No.: US 10,015,923 B2
(45) Date of Patent: Jul. 10, 2018

(54) LINKAGE CONTROL SYSTEM ON A VEHICLE

(71) Applicant: AGCO International GmbH, Hesston, KS (US)

(72) Inventors: Christian Gschwendtner, Marktoberdorf (DE); Guenther Ostenried, Marktoberdorf (DE); Werner Unsinn, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/423,072

(22) Filed: Feb. 2, 2017

(65) Prior Publication Data

US 2017/0215328 A1    Aug. 3, 2017

(30) Foreign Application Priority Data

Feb. 2, 2016    (GB) .................................. 1601869.9

(51) Int. Cl.
  *A01B 63/00*    (2006.01)
  *A01B 63/118*    (2006.01)

(52) U.S. Cl.
  CPC .......... *A01B 63/008* (2013.01); *A01B 63/118* (2013.01)

(58) Field of Classification Search
  CPC ............................ A01B 63/008; A01B 63/118
  See application file for complete search history.

(56) References Cited

U.S. PATENT DOCUMENTS

| 4,023,622 | A | * | 5/1977 | Gregerson | ........... | A01B 63/112 172/3 |
| 4,136,743 | A | * | 1/1979 | van der Lely | ....... | A01B 73/042 172/117 |
| 4,315,548 | A | * | 2/1982 | Nakamura | ........... | A01B 63/112 172/430 |
| 4,492,272 | A | * | 1/1985 | Jensen | ................... | A01B 35/18 172/178 |
| 4,979,092 | A | | 12/1990 | Bergene et al. | | |
| 5,997,024 | A | | 12/1999 | Cowley | | |
| 6,076,612 | A | | 6/2000 | Carr et al. | | |
| 6,196,327 | B1 | | 3/2001 | Patel et al. | | |
| 6,321,851 | B1 | | 11/2001 | Weiss et al. | | |

(Continued)

FOREIGN PATENT DOCUMENTS

EP    2765844 A1    8/2014
EP    2889515 A1    7/2015

(Continued)

OTHER PUBLICATIONS

UK Intellectual Property Office, International Search Report related for Priority UK Application No. GB1601869.9, dated Jul. 12, 2016.

(Continued)

*Primary Examiner* — Russell Frejd

(57) ABSTRACT

A vehicle having a linkage for attaching an implement including a control system for controlling a draft mode of operation in which the linkage is automatically raised and lowered depending on a draft force detected by the vehicle and a lifting cylinder, and when the vehicle travels at low speeds, or is driven in reverse or is stationary, the control system automatically sets the detected draft force to zero and the draft control mode of operation is maintained.

15 Claims, 4 Drawing Sheets

(56) References Cited

U.S. PATENT DOCUMENTS

| | | | |
|---|---|---|---|
| 9,074,546 B2 * | 7/2015 | Asami | E02F 9/2246 |
| 2003/0217852 A1 | 11/2003 | Bernhardt et al. | |
| 2012/0185137 A1 | 7/2012 | Schedgick et al. | |
| 2015/0289436 A1 | 10/2015 | Singh | |

FOREIGN PATENT DOCUMENTS

| | | |
|---|---|---|
| GB | 2326955 A1 | 1/1999 |
| WO | 2013/053645 A1 | 4/2013 |

OTHER PUBLICATIONS

European Patent Office, International Search Report for related EP Application No. EP17153066, dated Jul. 13, 2017.

* cited by examiner

LINKAGE CONTROL SYSTEM ON A VEHICLE

BACKGROUND

Field of the Invention

This invention concerns an implement detection arrangement for a tractor.

Description of Related Art

A hitch, such as a three-point linkage is one known arrangement used to attach implements to vehicle, for example an agricultural tractor for towing. The implement may be fully-mounted or semi-mounted whereby a semi-mounted implemented has a wheel engaging with the ground during soil operation while a fully-mounted implement puts all its load on the three-point linkage.

Three point linkages most frequently consist of two lower lifting arms to which an implement is attached. The lower lifting arms can be pivoted by respective hydraulic actuating cylinders to adjust the height position of the implement relative to the ground. Furthermore, these lower lifting arms may be manually adjusted in length and thus be adapted to the type of implement to be attached. An additional top link connects the implement to the tractor on a level above the lower lifting arms. This top link is used to pivot the implement about a horizontal transverse axis and is adjustable by means of a threaded connection, or a hydraulic cylinder.

Alternative designs of three-point linkages are known, such as the arrangements shown in U.S. Pat. No. 6,321,851, US2003/217852 and U.S. Pat. No. 5,997,024 in which the lower links are replaced by two, or four variable length hydraulic rams. This variable length ram arrangement enables multi axis movement of any implement attached to the linkage.

To control the three-point linkage, modern tractors are mainly equipped with electronic linkage control systems to improve work quality and operator comfort during operation.

Such electronic linkage control systems operate in three well known modes:

I) Position control mode: In general, the tractor speed is kept constant by a speed control system and the position of the lower lifting arms is sensed directly or indirectly so that the working depth of the implement in the soil can be adjusted within limits set by the operator whilst the speed of the tractor is kept constant. In the position control mode, the height of the linkage is determined by a function, H which relies solely on a height position component HP inputted or controlled by the tractor operator by means of, for example, a Depth Controller.

II) Draft control mode: The implement is raised and lowered in the soil automatically depending on the draft force applied by the implement to reduce fuel consumption, avoid engine stall or avoid damage of the implement or tractor. Again, vehicle speed is kept constant. If the implement is lowered into the ground an initial draft is applied defining a zero level. The operator can then set a value representing a force increase which means that the operator can decide how fast the implement is lifted when a small force increase or a large force increase occurs. The value of the force entered by the operator does not represent an exact value of the force applied, e.g. 5 kN, but defines the responsiveness of the draft control. The objective of this function is to move the implement while avoiding excessive draft or pull force variations. Therefore, a draft force sensor, typically in the form of a draft force sensing pin which connects the lower lifting arms to the tractor chassis is used to measure the horizontal load applied to the tractor by the implement. In the draft control mode, the height of the linkage is determined by a function, H which relies on a height draft component HD resulting from the draft force.

III) Intermix control mode: This control arrangement, as its name implies is a mixture of position and draft control modes in which a draft control system can only lift the implement within a limited range of positions. This function is provided to avoid excessive movement of the implement in the soil resulting in poor working quality. Again, vehicle speed is kept constant by a speed control system. In the intermix control mode, the height of the linkage is determined by a function H which relies on both the height draft component HD (from the draft mode) and the height position component HP (from the position control mode). A mix controller can vary the ratio of HD:HP and thus vary the influence from each of the position and draft control modes.

Only the draft control and intermix mode (both referred to as draft control modes) operate under measurement of the draft force. Generally, deactivating the draft modes results in that the system enters the position mode with no draft force influencing the lifting heights. It may, however be difficult to install a draft force sensing pin due to the complex three-dimensional geometry of a linkage.

The applicant's pending application WO2013/053645 describes an electronic linkage control wherein the draft force sensing pin is omitted and the variation of the draft force of the linkage is determined from the variation in the hydraulic drive circuit pressure. As described in WO2013/053645, such systems may also be used for implements which are simply towed by connection to e.g. a ball hitch, rather than being hitch-mounted. Different to fully-mounted implements the weight of the implement mainly rests on the ground via the implement wheels, and actuators are provided on the implements controlling the linkage thereon to raise and lower the soil-engaging means. The actuators, mainly hydraulic actuating cylinders similar to those used for three point linkages, are thereby supplied and controlled by the hydraulic supply system and valve arrangements of the tractor.

Furthermore, an implement may be semi-mounted, which means that the implement is mounted to the lower lifting arms of the tractor and further may be equipped with a ground engaging wheel so that the weight of the implement rests on the lower links and the ground via the implement wheels. To raise and lower the soil engaging means of the implement, the linkage of the tractor and the linkage of the implement must be adjusted conjointly.

Accordingly, the term "linkage" may be understood as not limited to a three-point linkage of a tractor, but may also include linkages to move soil-engaging means of towed implements.

Normally, in a draft control mode, the operator sets a value indicative of an acceptable draft force (depending on the condition of the ground and desired vehicle speed). If the draft force then increases continuously because a plough in the ground has hit a rock, the draft control will move the linkage upwards and therefore the plough will move upwards so that the draft force is reduced. If the draft force is reduced, the draft control mode will operate to lower the linkage and the plough towards the ground again. In this way, the plough will automatically pass a rock in the ground avoiding damage to it.

In addition to the automatic movement of the linkage in the draft control mode, the operator can also manually adjust the height of the linkage by using a Depth Controller in the cab.

Problems can arise with the linkage controls described above when an operator decelerates to a standstill with an implement attached. If an implement is being carried in a transport position (that is the linkage holds the implement so that it does not touch the ground) and the draft mode is not switched off, as the tractor is slowed down the linkage and implement is lowered. There is therefore a risk of damage to the implement, or uncoupling of the implement. The operator should lock the linkage, or switch to a positional mode to avoid such an event. This can be easily forgotten by an operator. Further, for the operator's comfort and economy of fuel, it is preferable for the vehicle to remain in the draft mode.

It is advantageous to have an automatic electronic linkage control which controls the height of the linkage of the tractor depending on the draft force. However, if no implement is attached, this function needs to be deactivated to avoid collision of the linkage with the ground or a tow bar. As a result, it is therefore necessary to detect whether an implement is attached to the linkage or not so that movement of the linkage by an automatic control can be prohibited, or permitted. If the implement is not fully-mounted to the three point hitch of the tractor but the position of the soil engaging means of implement may be controlled by draft force, the detection of the implement being trailed or semi-mounted may result in keeping the draft force active after confirmation by the operator.

A system may use a pressure sensor installed in the lifting cylinder of the linkage. For example, an unloaded linkage may result in the lifting cylinders indicating a pressure of 11 bar. When a plough is semi mounted that is, it is partly supported by the ground, the pressure may change to about 15 bar as the ground supports some of the weight of the plough. The difference therefore between the implement being semi mounted for operation and an unloaded linkage is around 4 bar which can be too small a change in pressure to detect. It can therefore be difficult for a system to recognise whether an implement is attached or not. When the plough is fully lifted into a transport position, or for rotation during a headland turn, the pressure will be greater than 25 bar which can be easily detected. However, during ploughing the external forces applied may result in the pressure in the cylinders detecting a pressure below 25 bar and the control system may register than no implement is attached. In such a situation, the draft control would be aborted by the control system and the position control mode activated. This leads to uncomfortable ploughing as the height of the linkage in the position control mode relies solely on a height position component HP of the linkage which is inputted, or controlled by the operator (instead of the height draft component HD resulting from the draft force as would be the case in the draft control mode).

Position sensors can be used to detect the position of an attached implement, or trailer to the linkage, but the position of the linkage does not indicate whether an implement is attached.

A tractor control unit may receive information by way of an ISOBUS system wherein an implement informs the tractor control unit of its attachment to the tractor. Alternatively an electric supply/light connector, or fluid couplings on the tractor to which the implement is attached may be used to detect the attachment of an implement. But these means do not provide information as to where the implement is attached, that is whether the implement is attached to the linkage or to a ball hitch, or at what height the implement is attached. Moreover, known systems do not automatically disengage the draft control mode as a tractor comes to a standstill, is driven at very low speeds under 1 kph, or is driven in reverse. Under these operating conditions, where the draft force drops, there is a danger of the implement being unintentionally lowered.

BRIEF SUMMARY OF THE INVENTION

Object of the Invention

It is an aim of the invention to provide a tractor control system which maintains the tractor in a draft control mode when the tractor is driven at a low speed, is stationary or is driven in reverse.

It is a further aim of the invention to provide a tractor control system which when in a draft control mode detects whether an implement is attached to the linkage of a tractor and detects whether the operator has made manual adjustments to the height of the linkage when the tractor is brought to a standstill, or is driven in reverse.

SUMMARY OF THE INVENTION

According to the invention there is provided a vehicle controlling a linkage for controlling the raising and lowering of the soil-engaging portion of an implement, the vehicle comprising a control system for a draft control mode of operation in which at least one linkage is automatically raised and lowered depending on a draft force detected by the vehicle, said linkage comprising a lifting cylinder, characterised in that when the vehicle travels at low speeds, or is driven in reverse or is stationary, the control system automatically sets the detected draft force to zero and the draft control mode of operation is maintained.

The implement may be provided as fully-mounted to a linkage of the vehicle, e.g. on a three-point linkage on a tractor, or the implement may be provided as a trailed or semi-mounted implement wherein the vehicle is coupled with and controls the actuation of a linkage provided on the implement, a linkage provided on the tractor or linkages provided on both the implement and the tractor itself.

Accordingly, there is provided a vehicle having a linkage for attaching an implement thereto, said vehicle comprising a control system for a draft control mode of operation in which the vehicle linkage is automatically raised and lowered depending on a draft force detected by the vehicle, said linkage comprising a lifting cylinder, characterised in that when the vehicle travels at low speeds, or is driven in reverse or is stationary, the control system automatically sets the detected draft force to zero and the draft control mode of operation is maintained.

There is also provided a vehicle to be coupled with a trailed implement, the trailed implement provided with a linkage to raise and lower soil engaging means, the linkage controlled from the vehicle, said vehicle comprising a control system for a draft control mode of operation in which the implement linkage is automatically raised and lowered depending on a draft force detected by the vehicle, said linkage comprising a lifting cylinder, characterised in that when the vehicle travels at low speeds, or is driven in reverse or is stationary, the control system automatically sets the detected draft force to zero and the draft control mode of operation is maintained.

There is also provided a vehicle having a linkage for attaching an implement thereto, the vehicle to be coupled with a semi-mounted implement, the semi-mounted implement provided with a linkage to raise and lower soil engaging means, the linkage of the tractor and the linkage of the implement controlled conjointly from the vehicle, said vehicle comprising a control system for a draft control mode of operation in which the linkages are automatically raised and lowered depending on a draft force detected by the vehicle, said linkages comprising a lifting cylinder, characterised in that when the vehicle travels at low speeds, or is driven in reverse or is stationary, the control system automatically sets the detected draft force to zero and the draft control mode of operation is maintained.

By setting the detected draft force to zero, the invention maintains the vehicle in a draft control mode. Since the draft force is maintained at zero, no change in draft force is detected and therefore there is no movement of the linkage and any attached implement. As a result, the problems of automatic unintended movement of the linkage when the draft force drops are avoided. Moreover, it is more economical, as well as more convenient for the operator to maintain the vehicle in a draft control mode rather than changing it to a position control mode.

Preferably, the linkage is set at the height it is when the draft force is set to zero, said height being the set height. The set height can then be recorded by the control system.

When the vehicle travels at a low speed or is driven in reverse or is stationary, the control system preferably records the set height of the linkage and the height of the linkage is monitored during a monitoring period and if the height of the linkage differs from the set height by 3% or more, the operator is warned to check that an implement is attached to the linkage. If there has been a movement of the linkage of 3% or more from the set height, there is a possibility that an attached implement has come into contact with the group and decoupled from the linkage. The operator is therefore warned to check this.

Additionally of alternatively, if a difference in height of 3% or more is detected, the draft control mode may be aborted.

If no difference in height is detected, the control system preferably determines that an implement is attached to the linkage.

If the vehicle speed increases within the monitoring period, the draft control mode of operation preferably resumes and the linkage is moved depending on the draft force detected. In this way, the system reverts to the normal way of controlling the height of the linkage in response to the draft force detected.

Preferably, the lifting cylinder comprises a pressure sensor to determine the load on the linkage.

The linkage preferably comprises a position sensor to determine the height of the linkage.

More preferably, the lifting cylinder comprises a position sensor to detect the height of the linkage.

The vehicle is preferably an agricultural tractor.

There is further provided a control method for a draft control mode of a vehicle having a linkage to raise and lower soil engaging means of an implement, the method comprising the steps of:

detecting a draft force experienced by an implement provided at the vehicle;

providing a draft control mode of operation for the vehicle, in which at least one linkage is automatically raised and lowered depending on a detected draft force;

monitoring the movement of the vehicle; and when the vehicle travels at low speeds, or is driven in reverse or is stationary, setting the detected draft force to zero to maintain the draft control mode of operation.

It will be understood that the method may be further adapted to incorporate the steps as described above in relation to the operation of the vehicle.

There is also provided a controller for a vehicle configured to carry out the method as described above.

There is also provided a computer program product comprising a non-transitory storage medium readable by a processing circuit and storing instructions for execution by the processing circuit for performing the steps of the above method.

BRIEF DESCRIPTION OF THE DRAWINGS

The invention will now be described, by example only, with reference to the following drawings in which.

DETAILED DESCRIPTION OF THE INVENTION

Figure 1:
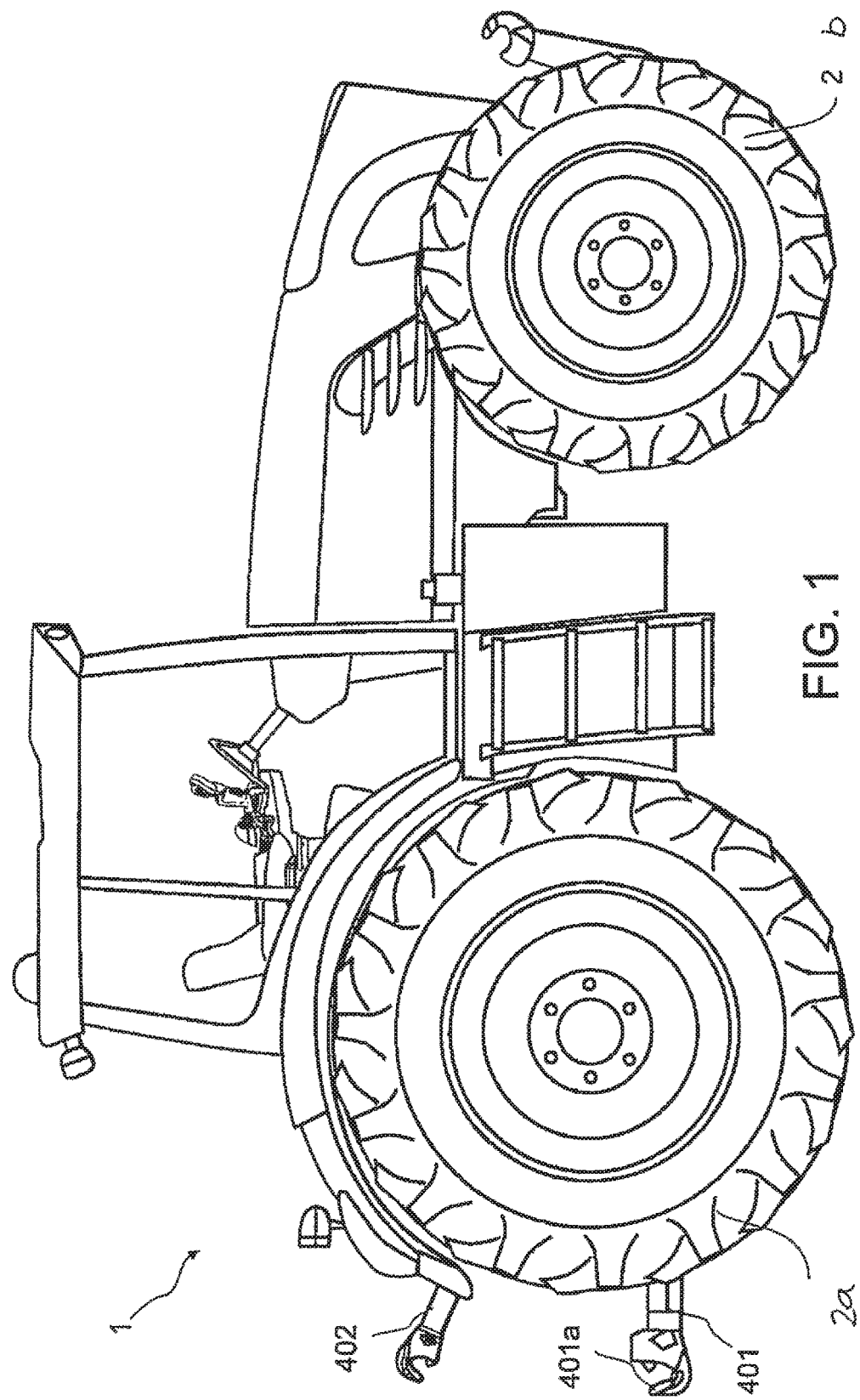
FIG. 1 is a side view of a tractor.

Referring to the drawings, an agricultural tractor 1 has a driveline 2 having a combustion engine 3, a continuously variable transmission (CVT), T of the hydrostatic-mechanical split type and a rear axle housing 300. Combustion engine 3 is connected to the CVT, T by chassis part 310. Rear wheels 2a and front wheels 2b are driven by driveline 2.

A three-point linkage 400 is attached to the rear axle housing 300 and mainly consists of two lower lifting arms 401 to which an implement is attached. A plough 500 with ground engaging means 501 is attached to the lower lifting arms 401. An additional top link 402 connects the implement 500 to the tractor 1. The top link 402 is of a hydraulic type adjustable in length to adjust the inclination of the plough 500 with respect to the ground. The lower lifting arms 401 can be pivoted about axis A by respective hydraulic lifting cylinders 403 which move rocker arm 404 and lift rod 405. The height of the linkage can thus be changed by pivoting the lifting arms about axis A. By height of the linkage, it is meant the height of a part of the lifting arms relative to the ground. The height may be measured perpendicular to the ground, or otherwise. The hydraulic actuating cylinders 403 are supplied with an actuating fluid by a control valve 406. Control valve 406 controls whether chamber 403a (for lifting the implement) or chamber 403b (for lowering the implement) of the hydraulic actuating cylinders 403 is charged with fluid. Control valve 406 is connected to a pump 407 which is driven by combustion engine 3 and connected to fluid tank 108.

The position of the lower lifting arms 401 is indirectly measured by a position sensor 409 which senses the position of a cam 410 attached to rocker arm 404.

An additional pressure sensor 411 is provided to measure the fluid pressure in the chamber 403a of the hydraulic actuating cylinders 403. The fluid in chamber 403a is compressed when the implement weight is fully taken up by the three-point linkage 400 and therefore a pressure increase indicates movement of the implement to a high position which is off the ground. Such a position is referred to as a transport position.

A tractor control unit 13 is provided to control various functions of the vehicle. The control unit 13 is electronically connected to various components such as the transmission and display and input devices via a CAN-BUS system, for example. The control unit 13 also contains software to drive the electronic linkage control system. The control unit 13 is connected to an input and display device 14 in the tractor cab 5 to receive inputs from the operator and to show information to the operator. The input and display device 14 includes a means to adjust and display parameters relating to the electronic linkage control system, such as the mix controller or the depth controller described above.

Position sensor 409, control valve 406 and pressure sensor 411 are connected to the control unit 13.

As described in WO2013/053645 of the applicant, the driveline 2 or transmission T, may be of hydrostatic mechanical split type transmission. Driveline 2 or transmission T contains sensors to determine various driving parameters such as the draft force, the vehicle speed, the driving direction and whether the vehicle is stationary or not. Stationary here has its usual meaning of not moving or being at a standstill.

As draft force is constantly measured in the system, this parameter can be used to control the linkage based on an increased draft force applied by the implement.

So, by monitoring the draft force which is already done for transmission control and protection purposes, an increase or decrease of the draft or pull force can be detected and processed by the electronic linkage control system to provide modes such as draft, intermix or position control modes.

The change in draft force is fed into a tractor control unit 13 which is programmed to lift, or lower the linkage in response to the change as programmed. In some cases, the detected draft force may be standardised and the standardised value forwarded to the control unit 13.

In the draft control mode there are various situations where the movement of the linkage in response to a change in draft force may cause problems. The draft force is the force applied by the implement against the pull force of the tractor and is therefore applied in a direction opposite to the direction of travel of the tractor. If the speed of the tractor is kept constant, a change in pull force results in a change of draft force and vice versa. An implement may be attached to a ball hitch instead of the linkage, or stowed in transport position where it is fully lifted off the ground, or attached to the linkage for working where it does not contact the ground, or be semi mounted or fully mounted to the linkage. The term implement covers all tools, attachments and equipment which can be attached to a tractor, or agricultural machine at the front, or rear including, but not limited to the following: ploughs, tow bars, sprayers, mowers, drills and planters.

A decrease in draft force results in the linkage being lowered which may cause the linkage to collide with the ground and uncouple the implement from the linkage or damage the ground (which may be a public road for example). This is likely to happen in the draft control mode when the tractor brakes are applied to bring the tractor to a stationary position and the tractor passes through low speeds or when the tractor is driven in reverse. By the terms low speed, it is meant a speed of 1 kph or less. In such cases, it is known for the low speed or reverse driving to be detected by the control system and for the height of the linkage to be maintained while the control system switches to the position control mode. When in the position control mode, the control system no longer relies on the height draft component HD and thus drag force no longer influences the height of the linkage. The control system calculates the linkage height based on the height position component HP only. However, in circumstances where the tractor is travelling at low speeds, or in reverse or is stationary and the linkage height is then further adjusted by the operator manually, for example by using a Depth Controller in the cab, the change of the height of the linkage will be greater than if the draft control mode was active. If the tractor is then driven in a forwards direction at a higher speed, that is above 1 kph, the control system changes automatically back to the draft control mode and the height draft component HD is used to determine the linkage height which results in an abrupt movement of the linkage which may destabilise the tractor, or result in the implement contacting the ground and decoupling.

The present invention addresses the aforementioned problems by the control system keeping the tractor in the draft control mode, setting the draft force to zero and holding the position of the linkage in a set or stable position, referred to as the set height when the tractor approaches low speeds, or travels in reverse, or is stationary. Setting the draft force to zero in accordance with the invention may mean that the draft force is set to zero by the control system, or that a standardised value representing a zero draft force zero is used by the control system.

As previously mentioned it is advantageous to have a control system which detects whether an implement is attached to the linkage or not so that, in a draft control mode, movement of the linkage can be automatically prohibited or allowed.

It is known for a system to use a pressure sensor installed in the lifting cylinder 403 of the linkage and compare a measurement with a reference pressure indicative of a load, such as an implement attached. A pressure measurement exceeding the reference pressure indicates that an implement is attached. A major drawback of such a system is that during operation in a field, external forces may result in the pressure in the lifting cylinders falling under the reference pressure indicating that an implement is not attached and that the draft control mode can be aborted. Operating the tractor in a non-draft control mode can be uncomfortable for the operator and may degrade the quality of the work performed for example, during ploughing.

The present invention addresses the aforementioned problems by the control system keeping the tractor in the draft control mode by improving the detection of an implement.

Initially the control system detects whether an implement is attached to the linkage in the known manner by sensing the pressure in the hydraulic cylinders 403. If the pressure is greater than a pre-determined reference pressure, for example 25 bar, the control system registers that an implement is attached and the implement condition "IMPLEMENT ATTACHED" is set. As long as the vehicle speed is not reduced below a predetermined speed of 1.0 kph, the implement condition "IMPLEMENT ATTACHED" is not changed even if the pressure in the cylinders 403 falls below the reference pressure.

Upon the tractor reaching a low speed below 1 kph, the control system sets the draft force to zero which has the effect of setting the linkage in its current position at the set height. The position detector 409 records the height at which the linkage has been held or set, referred to as the set height.

Since the implement condition "IMPLEMENT ATTACHED" is still active, the tractor is still in the draft control mode.

The operator can then make manual adjustments to the height of the linkage using the Depth Controller. Such adjustments may result in that the implement is lowered to a height where it is partially or fully in contact with the ground and where it could decouple from the linkage. For this reason, the height of the linkage is monitored by position sensor 409 for a short monitoring period of around 5 seconds.

If the height of the linkage above the ground differs by more than 3% of the set height within the monitoring period, this indicates that the operator has moved the linkage manually to a position which may enable the detachment of the implement. For this reason, the implement condition "IMPLEMENT ATTACHED" is aborted and switched to "IMPLEMENT DETACHED" (since the implement may be fully or partially resting on the ground). This results in the draft control mode being aborted and/or a warning given to the operator to check the status of the implement. Based on the geometry of a linkage, movement of the linkage which results in a deviation of 3% or more of the set height may mean that the implement has been moved sufficiently such that decoupling is a possibility. After checking the status of the implement, the load detection procedure can then be restarted by sensing the pressure in the cylinders 403 and comparing it to a reference pressure as previously described.

A deviation of 3% or more from the set height has been chosen as being a height deviation at which the implement may decouple from the hooks 401a of the lower links 401 based on the geometry of the linkage and the position of the connection of the linkage to the tractor relative to the ground. The percentage deviation from the set height where decoupling is a possibility may vary for different vehicles. Furthermore, if an implement is detached by raising the linkage, the system may also monitor a deviation in the upwards direction.

If the linkage was not lowered during the monitoring period, the system infers that the implement is still attached.

Figure 2:
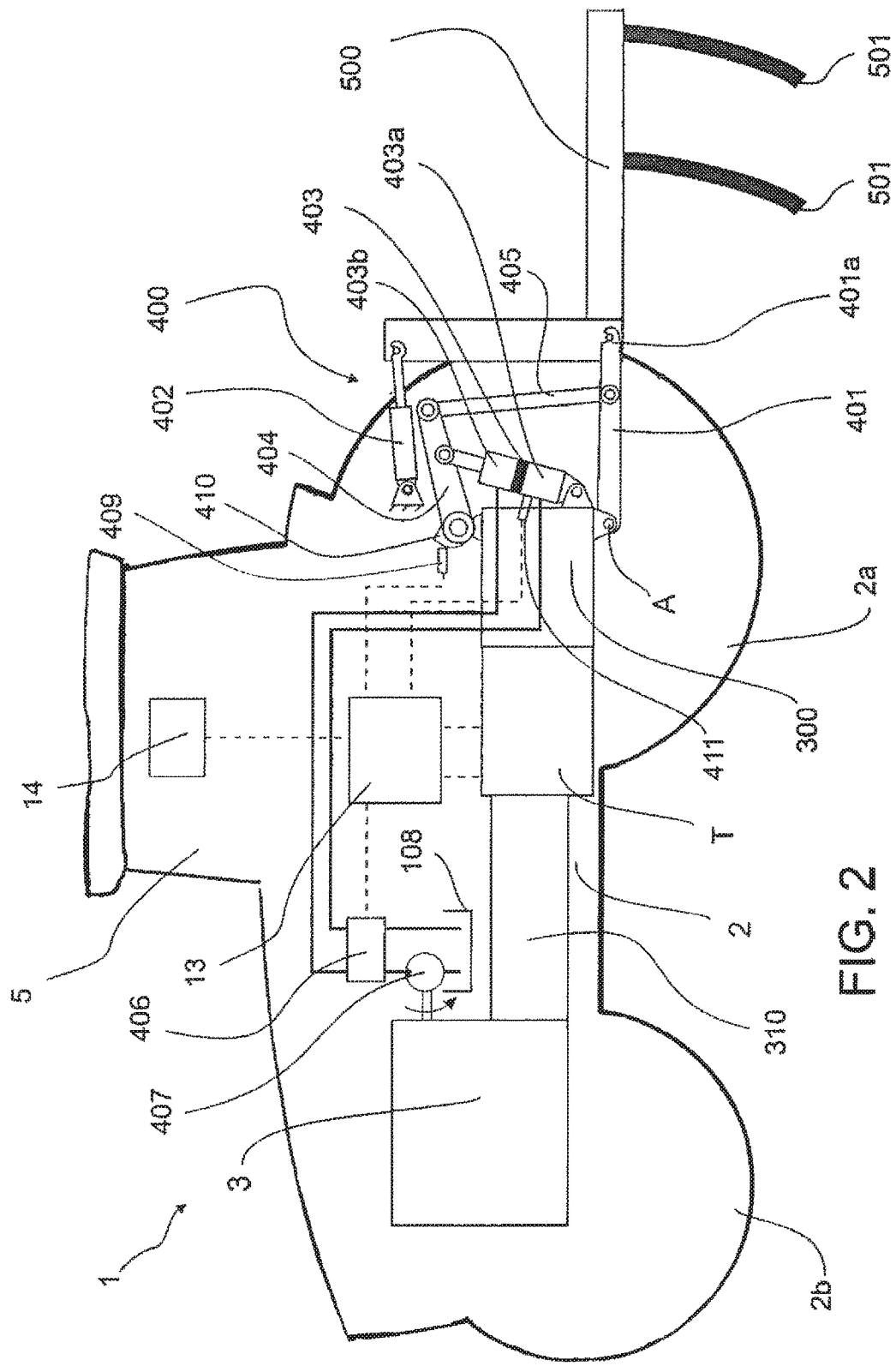
FIG. 2 is side view of a tractor showing a linkage at the rear in accordance with an aspect of the invention.
Figure 3:
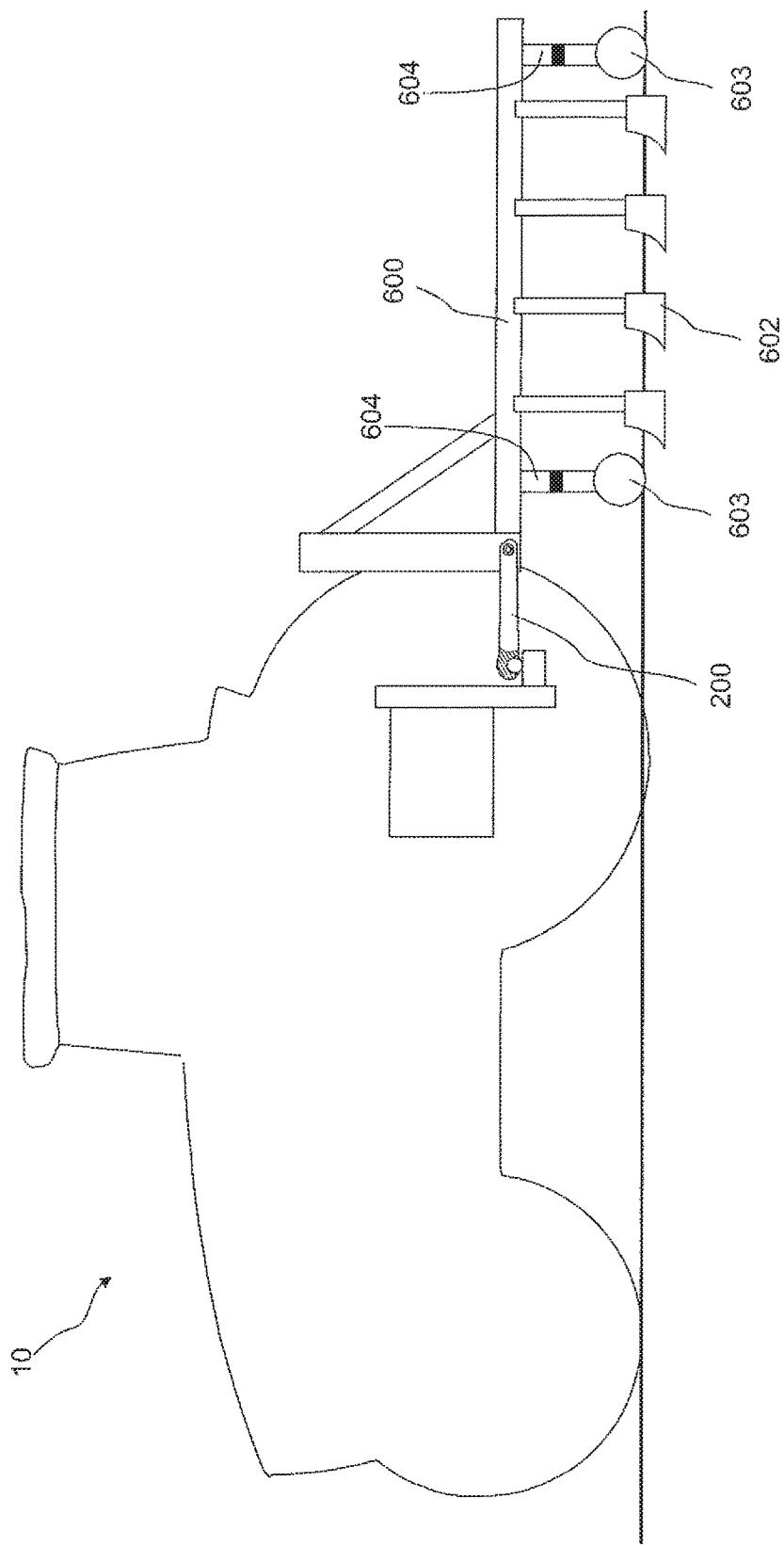
FIG. 3 is a side view of a tractor for control of a linkage on a trailed implement, in accordance with a further aspect of the invention.

In a further embodiment of the invention, in FIG. 3 a tractor 10 is shown which is coupled with a trailed implement 600 via a tow bar 200 or other suitable trailer connection. The trailed implement 600, which may comprise a plough or other similar tillage or soil cultivation apparatus, is provided with ground- or soil-engaging means 602, which are supported using at least one implement wheel 603. The height of the soil-engaging means 602, and accordingly their engagement with the ground, is controlled through actuation of an implement-mounted linkage or lift cylinder 604 coupled to the implement wheels 603, but it will be understood that other implement linkage configurations may be used. The actuation of the linkage 604 is controlled via a suitable communication connection with the tractor control unit 13 (shown in FIG. 2), in a similar manner as described above for a linkage-mounted implement.

In such a configuration, instead of aborting the draft mode when implement condition "IMPLEMENT DETACHED" is detected, the system may generate a warning and ask the operator to check if the implement is towed or semi-mounted instead and the implement is to be operated with draft force control. If the operator confirms, draft force mode would be kept active and the operator may be reminded to connect the respective hydraulic supply lines to the tractor to enable the vehicle control system to raise and lower the linkage of the implement accordingly.

Figure 4:
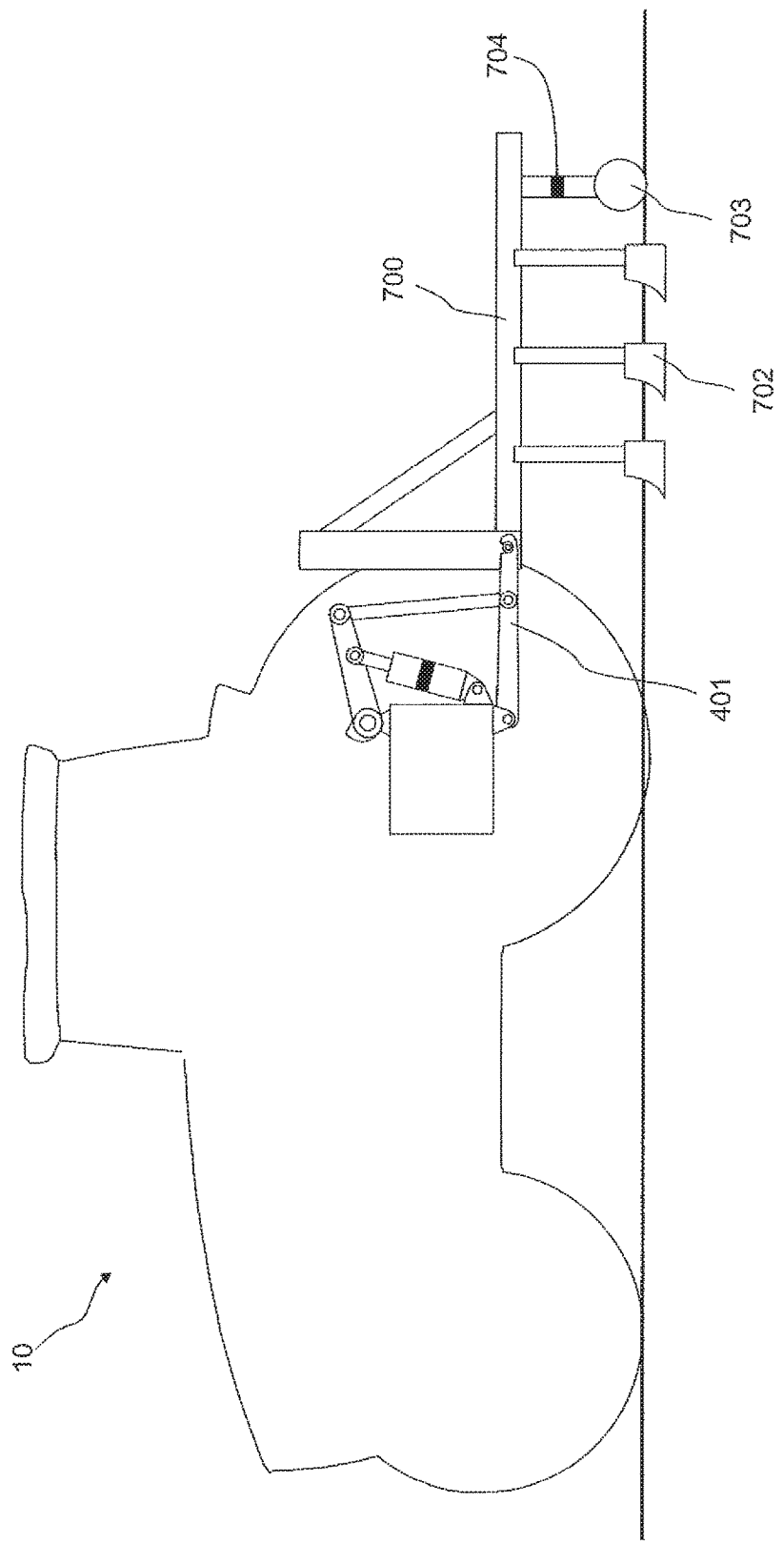
FIG. 4 is a side view of a tractor for control of a linkage on a semi-mounted implement, in accordance with a further aspect of the invention.

In a further embodiment of the invention, in FIG. 4 a tractor 10 is shown which is coupled with a semi-mounted implement 700 via the lower lifting arms 401. The semi-mounted implement 700, which may comprise a plough or other similar tillage or soil cultivation apparatus, is also provided with ground- or soil-engaging means 702, which are partly supported using at least one implement wheel 703. The height of the soil-engaging means 702, and accordingly their engagement with the ground, is controlled through actuation of an implement-mounted linkage or lift cylinder 704 coupled to the implement wheel 703 and the lower lifting arms 401 conjointly, but it will be understood that other implement linkage configurations may be used. The actuation of the linkage 704 is controlled via a suitable communication connection with the tractor control unit 13 (shown in FIG. 2), in a similar manner as described above for a linkage-mounted implement.

In such a configuration, instead of aborting the draft mode when implement condition "IMPLEMENT DETACHED" is detected, the system may generate a warning and ask the operator to check if the implement is towed or semi-mounted instead and the implement is to be operated with draft force control. If the operator confirms, draft force mode would be kept active and the operator may be reminded to connect the respective hydraulic supply lines to the tractor to enable the vehicle control system to raise and lower the linkage of the implement accordingly.

If within the monitoring period, the tractor travels above 1 kph in a forward direction, the tractor remains in the draft control mode and movement of the linkage is as usual when in the draft control mode.

In accordance with a first aspect of the invention, when the tractor travels at low speeds or travels in reverse, or is stationary, the control system automatically keeps the draft control mode active and changes the draft force to zero without changing the tractor to the position control mode. Any manual adjustments which are then made by the operator using the Depth Controller are calculated using the height draft component HD (from the draft control mode). As a result, once the tractor picks up speed (greater than 1 kph) in the forward direction, the control system returns to the usual draft control mode where the draft force is greater than zero. Using this method results in fewer abrupt movements of the height adjustment of the linkage when changing between draft and position control modes than is currently experienced.

In accordance with a second aspect of the invention, when the tractor travels at low speeds (1 kph or below) or travels in reverse, or is stationary, the control system keeps the draft control mode active, changes the draft force to zero, records the set height of the linkage monitors any deviation in height of the linkage over a monitoring period to determine whether there is a possibility that the implement has been decoupled. Where there is a possibility that de-coupling has happened, the draft control mode is aborted and/or the operator is alerted.

The invention provides a suitable control method for a draft control mode of a vehicle. The invention may be provided as a controller for use in a vehicle, the controller arranged to perform the steps of the method. Additionally or alternatively, the invention may be provided as a computer program product comprising a non-transitory storage medium readable by a processing circuit and storing instructions for execution by the processing circuit for performing the steps of the above method.

The invention is not limited to the embodiments described herein, and may be modified or adapted without departing from the scope of the present invention.

The invention claimed is:

1. A vehicle controlling a linkage for controlling the raising and lowering of a soil-engaging portion of an implement, the vehicle comprising a control system for a draft control mode of operation in which at least one linkage is automatically raised and lowered depending on a draft force detected by the vehicle, said at least one linkage comprising a lifting cylinder, characterised in that when the vehicle travels at low speeds, or is driven in reverse or is stationary, the control system automatically sets the detected draft force to zero and the draft control mode of operation is maintained.

2. The vehicle of claim 1, wherein the at least one linkage comprises a linkage configured to attach an implement thereto, where said implement attachment linkage is automatically raised and lowered depending on a draft force detected by the vehicle.

3. The vehicle of claim 1, wherein the vehicle is coupled with a trailed implement and said at least one linkage comprises a linkage provided on the trailed implement to raise and lower a soil engaging portion of said trailed implement, the linkage on the trailed implement being controlled from the vehicle, wherein the linkage on the trailed implement is automatically raised and lowered depending on a draft force detected by the vehicle.

4. The vehicle of claim 1, wherein the at least one linkage comprises a vehicle linkage configured to attach a semi-mounted implement to the vehicle, the semi-mounted implement provided with an implement linkage of said at least one linkage to raise and lower a soil engaging portion of the semi-mounted implement, said vehicle linkage and said implement linkage each controlled conjointly from the vehicle, said control system operating such that said vehicle linkage and said implement linkage are each automatically raised and lowered depending on a draft force detected by the vehicle, said vehicle linkage and said implement linkage each comprising a lifting cylinder, characterised in that when the vehicle travels at low speeds, or is driven in reverse or is stationary, the control system automatically sets the detected draft force to zero and the draft control mode of operation is maintained.

5. The vehicle as claimed in claim 1, wherein the at least one linkage is set at a height that the linkage is at when the draft force is set to zero.

6. The vehicle as claimed in claim 5, wherein the control system records the set height of the linkage controlled by the vehicle and the height of said at least one linkage is monitored during a monitoring period and if the height of said linkage differs from the set height by 3% or more, an alert is sent to check that an implement is attached to said linkage.

7. The vehicle as claimed in claim 6 wherein if no difference is detected between the set height of the linkage and the height of the linkage during the monitoring period, the control system determines that an implement is attached to a three point linkage of the vehicle.

8. The vehicle as claimed in claim 5, wherein the control system records the set height of the at least one linkage and the height of said linkage is monitored during a monitoring period and if the height of the linkage differs from the set height by 3% or more, the draft control mode is aborted.

9. The vehicle as claimed in claim 1, wherein if the vehicle speed increases during a monitoring period, the draft force resets to a detected value and the controlled linkage is moved depending on the draft force detected.

10. The vehicle as claimed in claim 1, wherein the lifting cylinder comprises a pressure sensor to determine the load on the linkage.

11. The vehicle as claimed in claim 1, wherein the at least one linkage comprises a position sensor to determine the height of the linkage.

12. The vehicle as claimed in claim 1, wherein the lifting cylinder comprises a position sensor to detect the height of the at least one linkage.

13. The vehicle as claimed in claim 1, wherein the vehicle is an agricultural tractor.

14. A control method for a draft control mode of a vehicle controlling at least one linkage to raise and lower a soil engaging portion of an implement, the method comprising the steps of:

detecting a draft force experienced by an implement provided at the vehicle;

providing a draft control mode of operation for the vehicle, in which the at least one linkage is automatically raised and lowered depending on a detected draft force;

monitoring the movement of the vehicle; and setting the detected draft force to zero when the vehicle travels at low speeds, is driven in reverse, or is stationary, for maintaining the draft control mode of operation.

15. A controller for a vehicle configured to carry out the method of claim 14.

* * * * *